US012779601B2

(12) United States Patent
Borman

(10) Patent No.: US 12,779,601 B2
(45) Date of Patent: Nov. 3, 2026

(54) SAW GUIDE SUPPORT

(71) Applicant: Gregory Borman, Buford, GA (US)

(72) Inventor: Gregory Borman, Buford, GA (US)

( * ) Notice: Subject to any disclaimer, the term of this patent is extended or adjusted under 35 U.S.C. 154(b) by 331 days.

(21) Appl. No.: 18/609,733

(22) Filed: Mar. 19, 2024

(65) Prior Publication Data

US 2025/0296183 A1 Sep. 25, 2025

(51) Int. Cl.
*B23Q 3/00* (2006.01)
*B23Q 3/04* (2006.01)

(52) U.S. Cl.
CPC ............... *B23Q 3/04* (2013.01); *B23Q 3/005* (2013.01); *B23Q 2220/004* (2013.01)

(58) Field of Classification Search
CPC .... B23Q 3/04; B23Q 3/005; B23Q 2220/004; B27B 9/04; B23D 47/02
See application file for complete search history.

(56) References Cited

U.S. PATENT DOCUMENTS 4,328,728 A * 5/1982 Ferdinand ............ B23D 45/042 83/765
7,240,400 B2 7/2007 Bonham
7,464,737 B2 12/2008 Duginske
8,752,459 B1 * 6/2014 Koresh ..................... B27B 9/04 83/477.1
9,821,450 B2 11/2017 Schumacher
10,421,182 B2 9/2019 Schumacher
11,407,099 B2 8/2022 Schumacher
2004/0227045 A1 11/2004 An et al.
2013/0160630 A1 * 6/2013 Groth ................... B23D 45/006 83/743
2025/0296183 A1 * 9/2025 Borman ................. B23D 47/02

FOREIGN PATENT DOCUMENTS

CN 116275278 A 6/2023
EP 3708317 A1 9/2020
JP 4324868 B2 9/2009
NL 1043937 B1 * 9/2022 ............... B27B 9/04

OTHER PUBLICATIONS

Dashboard Portable Workshop, "Guide Rail Bracket Set", (12 pages), found Online at https://www.dashboardpws.com/shop/guide-rail-bracket-bundle.

* cited by examiner

*Primary Examiner* — Yaritza Guadalupe-Mccall
(74) *Attorney, Agent, or Firm* — Alston & Bird LLP

(57) ABSTRACT

In accordance with various embodiments of the present disclosure, a saw guide support is provided. In some embodiments, the saw guide support comprises a base plate adapted to be selectively attached to a work platform, a riser vertically slidably coupled to the base plate, a pivot plate hingedly coupled to the riser such that an angle between the riser and the pivot plate is selectively adjustable, and a rotatable plate selectively rotatably coupled to the pivot plate and adapted to selectively receive a saw guide attached thereto. When the saw guide is selectively attached to the rotatable plate, the saw guide support is adapted to enable the saw guide to be pivoted and rotated relative to the work platform.

19 Claims, 16 Drawing Sheets

SAW GUIDE SUPPORT

FIELD OF THE INVENTION

Example embodiments of the present disclosure relate generally to woodworking devices and accessories and, more particularly, to hinged devices for attaching track saw guides to work platforms.

BACKGROUND

A track saw comprises an elongated rail or guide and a circular saw designed to ride on top of the guide, thereby enabling a straight cut to be made in whatever material (e.g., plywood) the guide is placed upon. It is known to selectively attach a hinged device (commonly termed a track saw hinge) to a work platform (e.g., a workbench) and then to selectively attach a track saw guide (or simply "saw guide") to the hinged device. Such a configuration enables straight cuts of material placed on the work platform and enables the saw guide to be pivoted upward and out of the way when positioning material to be cut or when not in use. Such conventional track saw hinges enable a 90-degree cut (i.e., 90 degrees relative to the rear edge of the work platform) but not at other angles.

Applicant has identified many technical challenges and difficulties associated with such track saw hinge. Through applied effort, ingenuity, and innovation, Applicant has solved problems related to track saw hinges by developing solutions embodied in the present disclosure, which are described in detail below.

BRIEF SUMMARY

Various embodiments described herein related to supports for saw guides.

In accordance with various embodiments of the present disclosure, a saw guide support is provided. In some embodiments, the saw guide support comprises a base plate adapted to be selectively attached to a work platform, a riser coupled to or integral with the base plate, a pivot plate hingedly coupled to the riser such that an angle between the riser and the pivot plate is selectively adjustable, and a rotatable plate selectively rotatably coupled to the pivot plate and adapted to selectively receive a saw guide attached thereto. When the saw guide is selectively attached to the rotatable plate, the saw guide support is adapted to enable the saw guide to be pivoted and rotated relative to the work platform.

In some embodiments, the pivot plate comprises an engagement member comprising a post projecting from a first planar surface of the pivot plate and a bilaterally truncated disk at a distal end of the post, the rotatable plate defines an engagement slot having an elongated opening with at least one arcuate end and a circular shoulder around the arcuate end, and the rotatable plate is selectively coupled to the pivot plate by aligning the elongated opening of the engagement slot with the bilaterally truncated disk of the engagement member, inserting the bilaterally truncated disk of the engagement member into the elongated opening of the engagement slot, and rotating the rotatable plate such that the circular shoulder is engaged between the bilaterally truncated disk and the first planar surface of the pivot plate.

In some embodiments, the base plate is adapted to be selectively attached to a rear, vertical surface of the work platform.

In some embodiments, the base plate is adapted to be horizontally slidably positionable relative to the work platform.

In some embodiments, the saw guide support further comprises a locking mechanism to secure a rotatable position of the rotatable plate relative to the pivot plate.

In some embodiments, the riser is vertically slidably coupled to the base plate.

In accordance with various embodiments of the present disclosure, a saw guide support system is provided. In some embodiments, the saw guide support system comprises a first saw guide support and a second saw guide support. The first saw guide support comprises a first base plate adapted to be selectively attached to a first end of a work platform, a first riser coupled to or integral with the first base plate, a pivot plate hingedly coupled to the first riser such that an angle between the first riser and the pivot plate is selectively adjustable, and a rotatable plate selectively rotatably coupled to the pivot plate and adapted to selectively receive a proximal end of a saw guide attached thereto. The second saw guide support comprises a second base plate adapted to be selectively attached to a second end of the work platform opposite the first end, a second riser coupled to or integral with the second base plate, a support surface extending from an upper end of the second riser, and a support pin extending upward from the support surface. When the saw guide is selectively attached to the rotatable plate, the first saw guide support is adapted to enable the saw guide to be pivoted and rotated relative to the work platform. The support pin is adapted to support a distal end of the saw guide when the saw guide is pivoted down to a substantially horizontal position.

In accordance with various embodiments of the present disclosure, a method of supporting a saw guide above a work platform is provided. In some embodiments, the method comprises (a) attaching a first saw guide support to a first end of the work platform, (b) sliding a first base plate of the first saw guide support relative to the work platform to select a desired position of the first saw guide support; (c) attaching a proximal end of the saw guide to rotatable plate of the first saw guide support; (d) attaching a second saw guide support to a second end of the work platform opposite the first end, (e) sliding a second base plate of the second saw guide support relative to the work platform to select a desired position of the second saw guide support; (f) pivoting the saw guide to a desired angle to match an angle between the first saw guide support and the second saw guide support; and (g) pivoting the saw guide downward until a distal end of the saw guide rests on a support pin of the second saw guide support.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
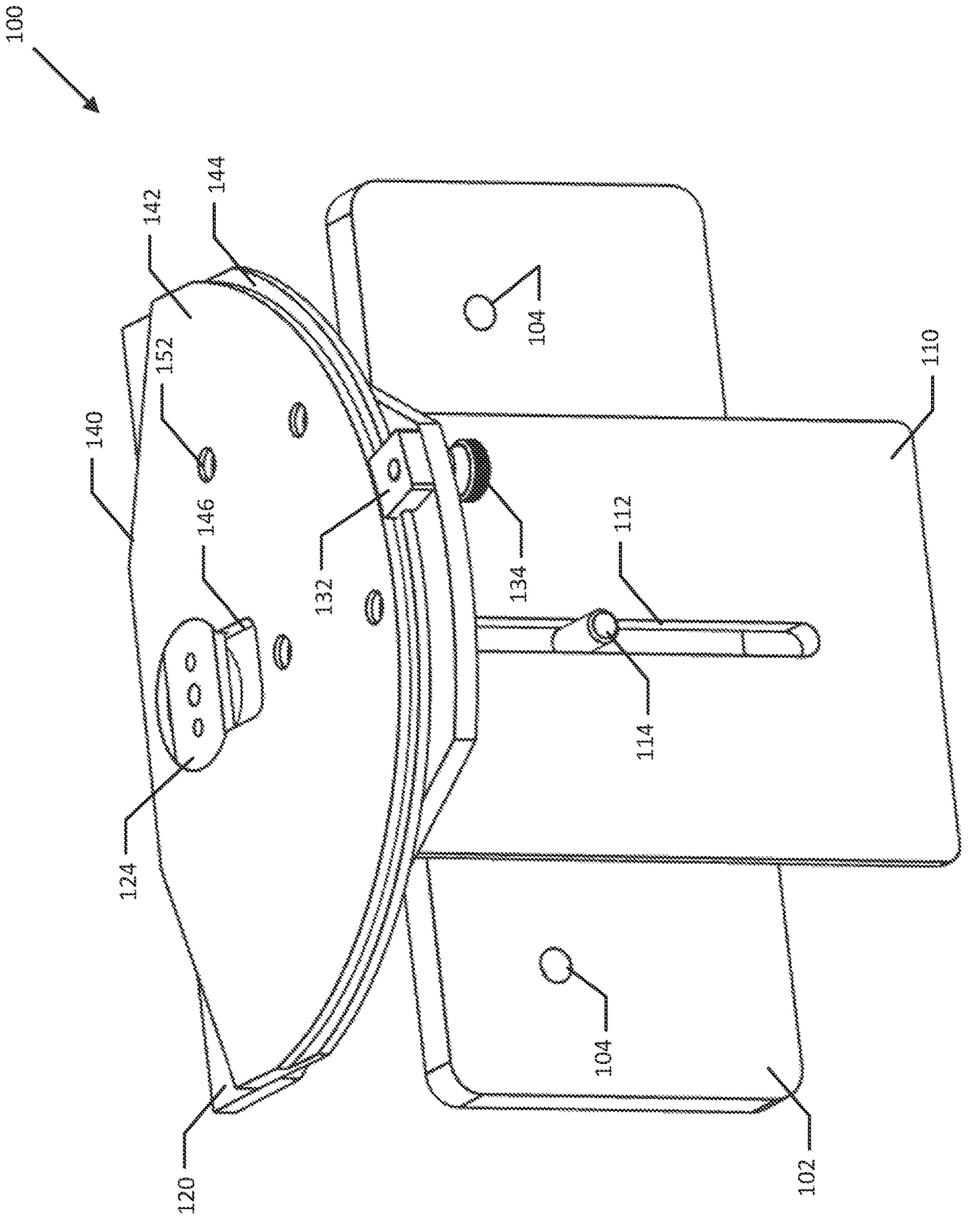
FIG. 1 is a perspective view of an example first saw guide support from the rear, top, and right, in accordance with some embodiments of the present disclosure.
Figure 2:
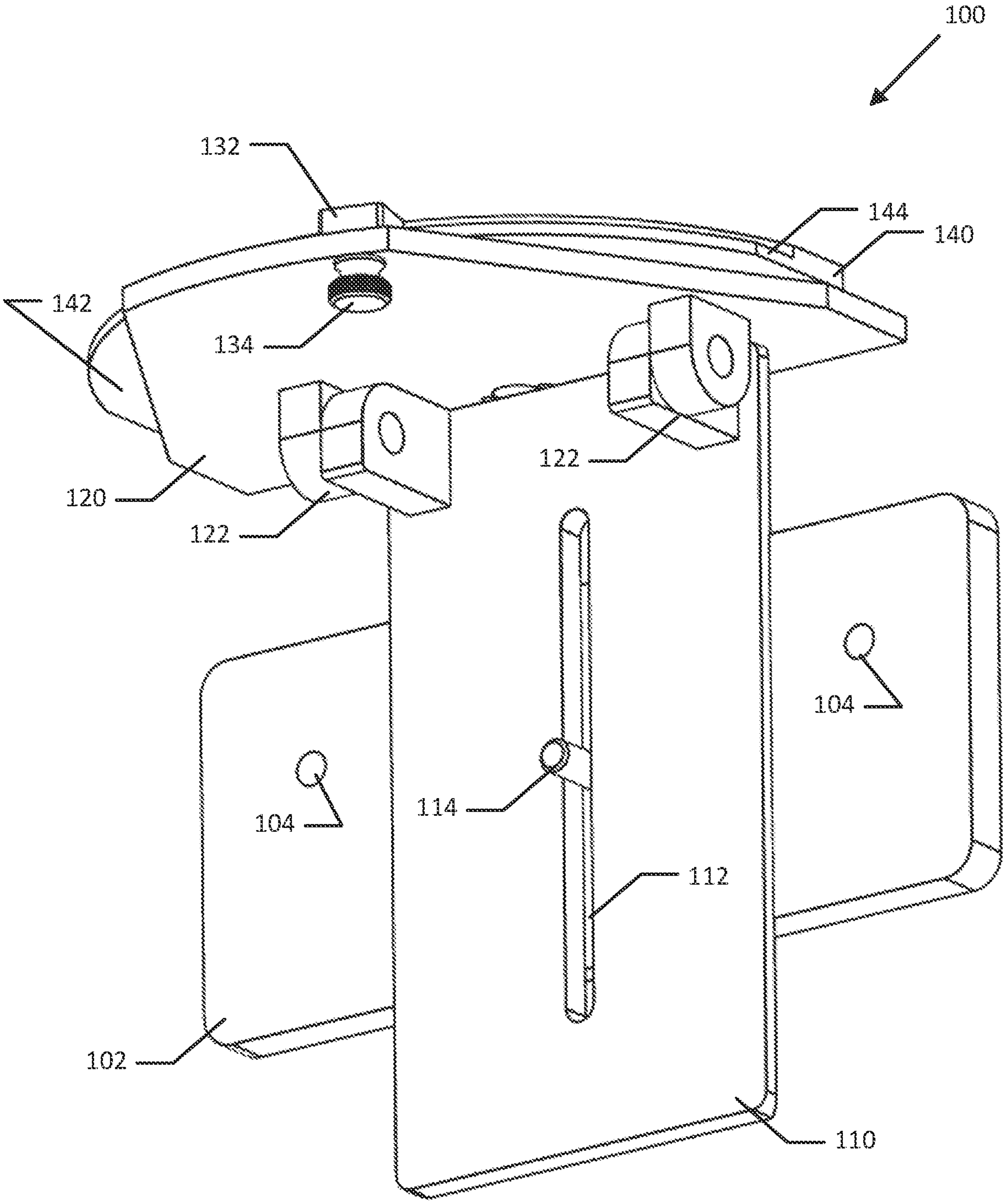
FIG. 2 is a perspective view of the first saw guide support of FIG. 1 from the rear, bottom, and left.
Figure 3:
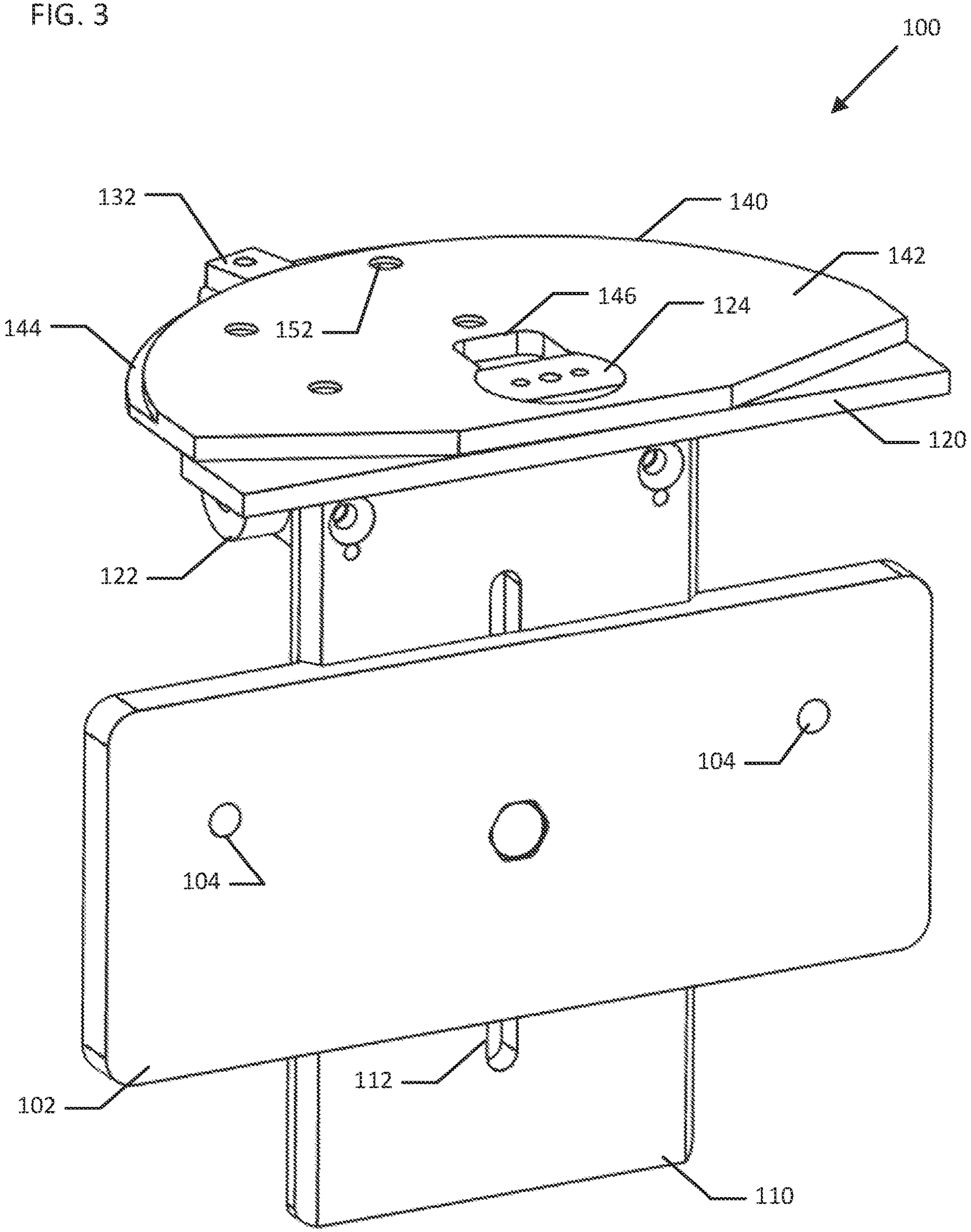
FIG. 3 is a perspective view of the first saw guide support of FIG. 1 from the front, top, and left.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various embodiments of the present disclosure overcome the above technical challenges and difficulties and provide various technical improvements and advantages based on, for example, but not limited to, providing a saw guide support that enables a saw guide to not only be pivoted upward and out of the way when positioning material to be cut but also enables the saw guide to swivel to perform angled cuts (i.e., cuts at other than 90 degrees relative to the rear edge of the work platform). For purposes of the present disclosure, the terms "pivot" and "up/down" will be used to refer to movement of the saw guide that is perpendicular to its major planar surfaces, while the terms "swivel" and "side-to-side" will be used to refer to movement of the saw guide that is parallel to its major planar surfaces and perpendicular to its long edges.

Various embodiments of the present disclosure provide a saw guide support that has both a pivoting capability (to pivot an attached saw guide) and a rotating capability (to swivel an attached saw guide). In various embodiments, such a saw guide support is attachable to a rear edge of a work platform. Various embodiments of the present disclosure provide a saw guide support system having a first saw guide support (which may also be termed a rear saw guide support) that has both a pivoting capability and a rotating capability and is attachable to a rear edge of a work platform and having a second saw guide support (which may also be termed a front saw guide support) that is attachable to a front edge of a work platform and that supports a distal end of a saw guide when the saw guide is in its down/cutting position.

Referring now to the figures, FIGS. 1-4 illustrate an example first saw guide support, in accordance with some embodiments of the present disclosure. As seen in FIGS. 1-4, the first saw guide support 100 comprises a first base plate 102, a first riser 110 vertically slidably coupled to the first base plate 102, a pivot plate 120 hingedly coupled to the first riser 110 via hinges 122, and a rotatable plate 140 selectively rotatably coupled to the pivot plate 120. In various embodiments, a saw guide is selectively attachable to the rotatable plate 140 as described below.

Figure 4:
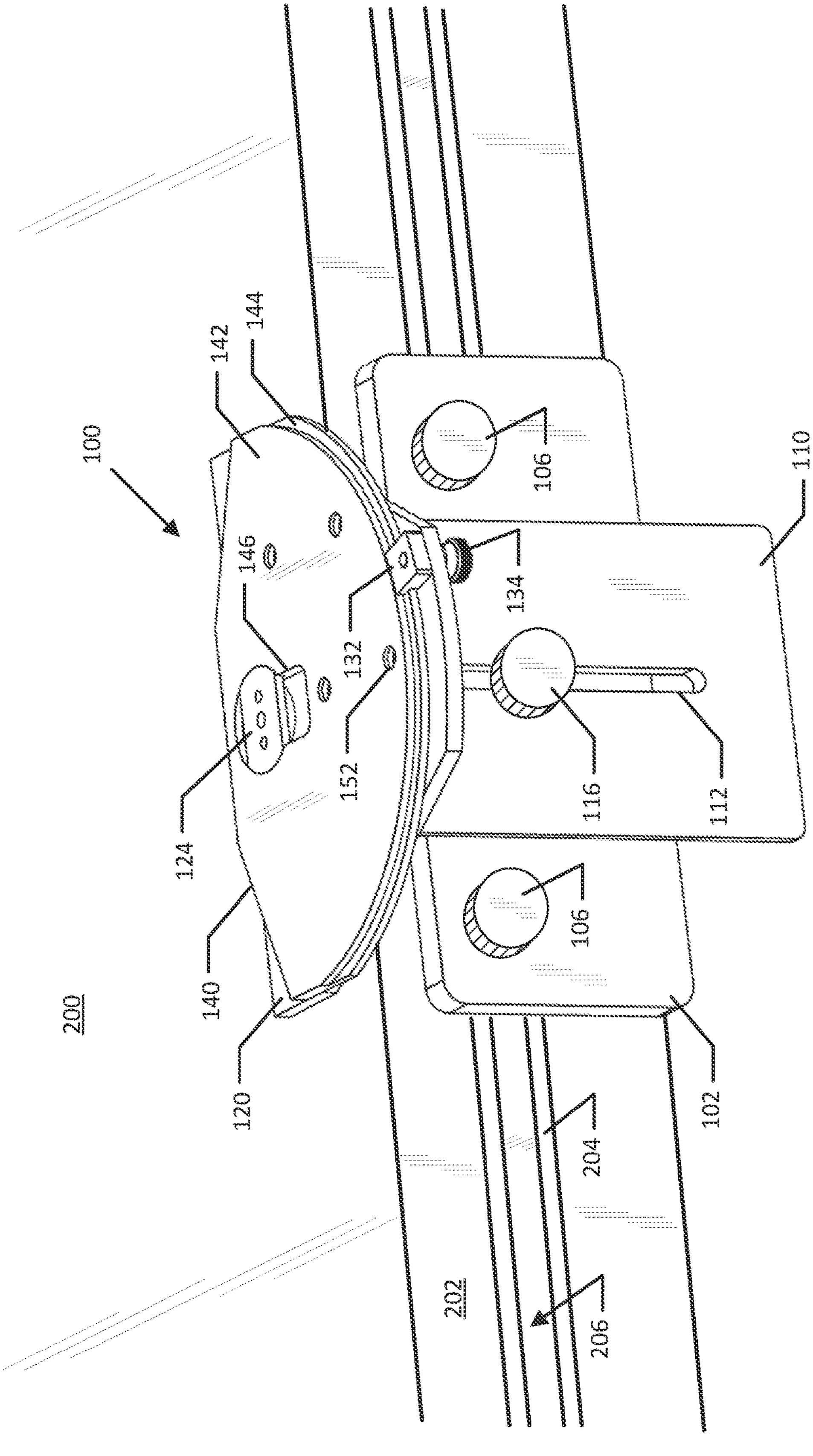
FIG. 4 is a perspective view of the first saw guide support of FIG. 1 from the rear, top, and right, attached to a work platform.

In various embodiments, the first saw guide support 100 is selectively attachable to a work platform, such as a work bench, via the first base plate 102. FIG. 4 illustrates the first saw guide support 100 attached to a rear vertical surface 202 of a work platform 200. (During a cutting operation, a user would typically be positioned on an opposite, front side of the work platform 200.) In the illustrated embodiment, the rear vertical surface 202 of the work platform 200 has an insert 204 (typically metallic) that defines a generally horizontal channel 206 to enable the mounting of various accessories (e.g., clamps, etc.) to the work platform 200. In the illustrated embodiment, the first base plate 102 has two mounting holes 104 defined therein. In various embodiments, the first base plate 102 is secured to the insert 204 by way of mounting posts (not illustrated) that protrude through the mounting holes 104 and into the channel 206 of the insert 204. In various embodiments, the mounting posts are tightened against the insert 204 using knobs 106 when the first base plate 102 (and therefore the first saw guide support 100) is in its desired position. In various embodiments, the first saw guide support 100 may be moved horizontally relative to the work platform 200 by loosening the knobs 106, sliding the first saw guide support 100 into a new desired position, and re-tightening the knobs 106. In various embodiments, any suitable mechanism may be used to secure the first saw guide support of embodiments of the present disclosure to a work platform.

In various embodiments, the first riser 110 is slidably coupled to the first base plate 102 to enable the first riser 110 (and correspondingly the pivot plate 120 and the rotatable plate 140) to be raised and lowered relative to the work platform 200. Raising or lowering the first riser 110 (and correspondingly the pivot plate 120 and the rotatable plate 140) relative to the work platform 200 enables a user to set a desired distance between the underside of an attached saw guide in a down position and the top surface of the work platform 200 based on the thickness of the material to be cut.

In the illustrated embodiment, the first riser 110 is slidably coupled to the first base plate 102 via a post 114 projecting outwardly from the first base plate 102 engaging with a substantially vertical slot 112 defined in the first riser 110. In the illustrated embodiment, the first riser 110 is secured at the desired height by tightening a knob 116 against the face of the first riser 110. In various embodiments, any suitable mechanism may be used to slidably couple and secure the first riser to the base plate.

Figure 6:
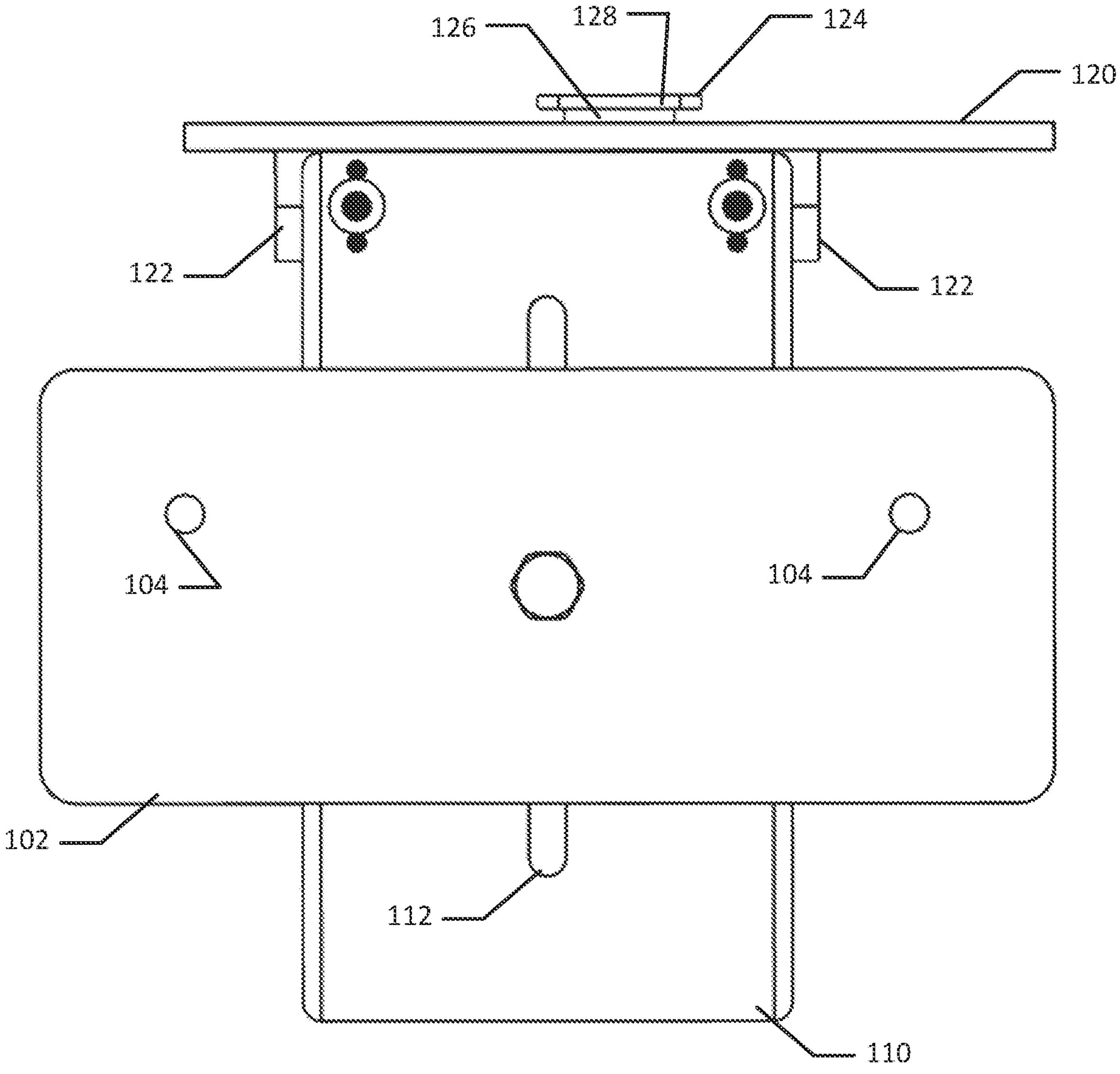
FIG. 6 is a front view of the first saw guide support of FIG. 1, with its rotatable plate removed.
Figure 12:
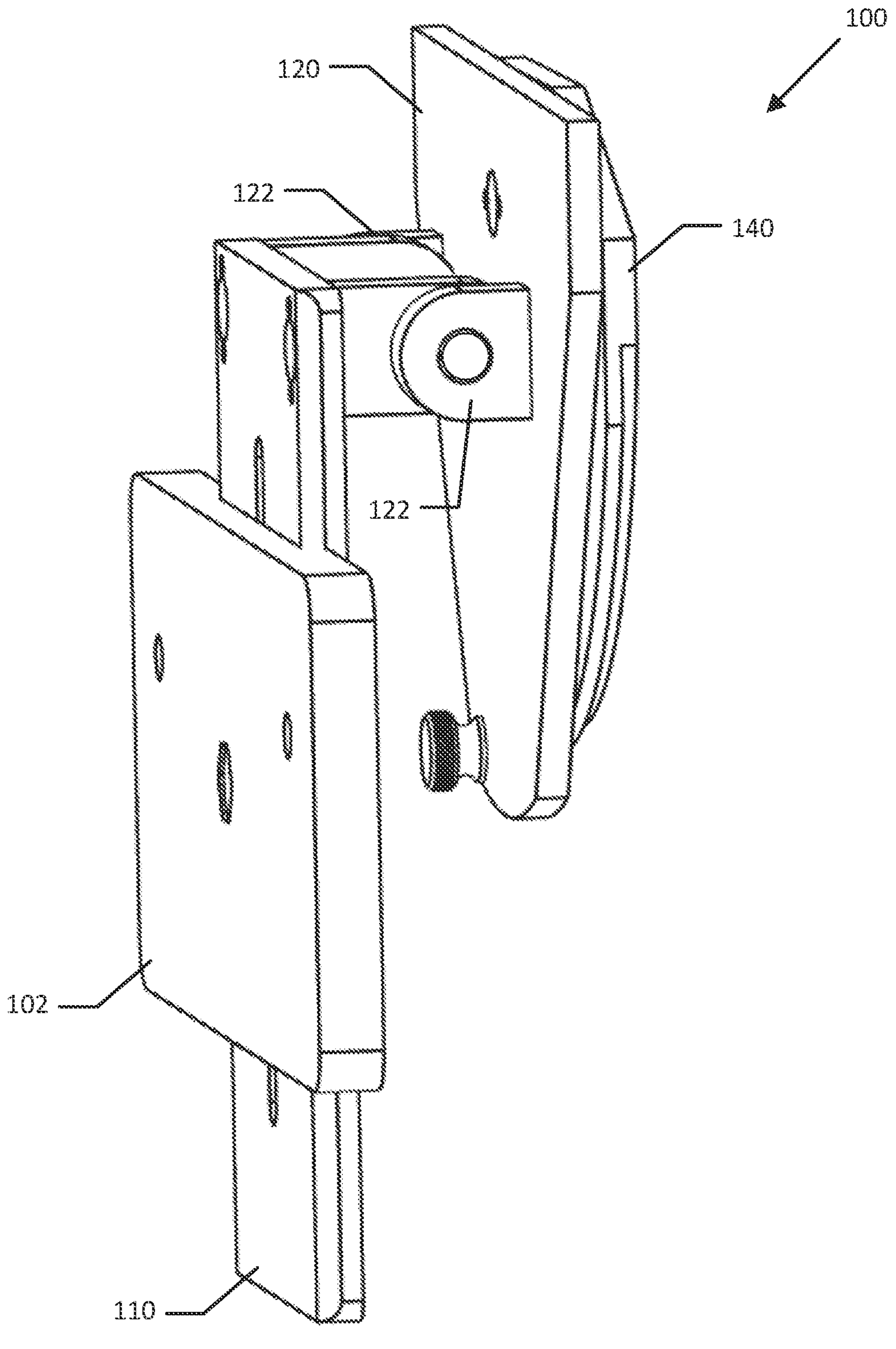
FIG. 12 is a perspective view of the first saw guide support of FIG. 1 from the front, top, and right, with its pivot plate in a position to pivot a saw guide fully upward.
Figure 13:
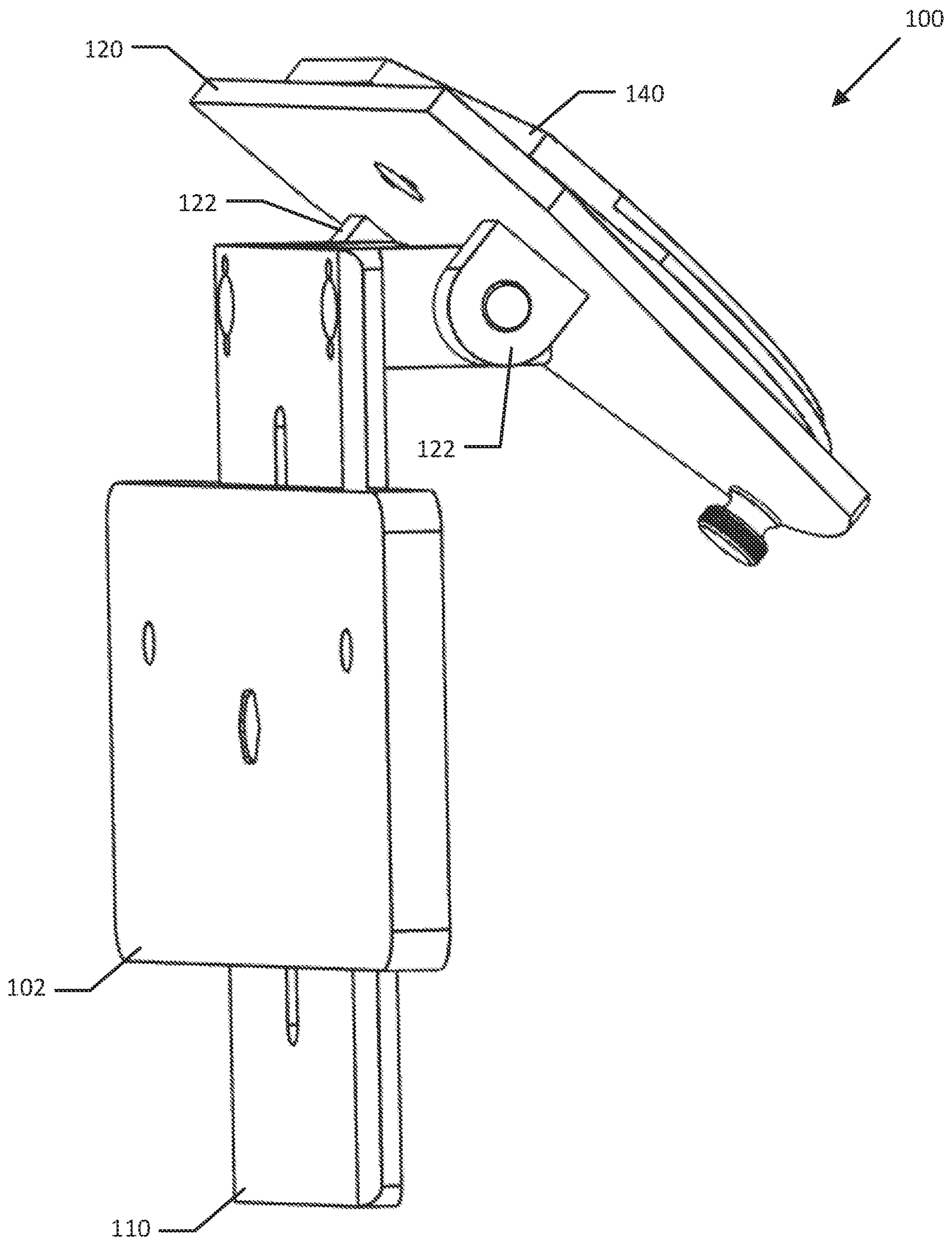
FIG. 13 is a perspective view of the first saw guide support of FIG. 1 from the front, top, and right, with its pivot plate in a position to pivot a saw guide partially upward.

In various embodiments, the pivot plate 120 is hingedly coupled to the first riser 110 such that an angle between the first riser 110 and the pivot plate 120 is selectively adjustable, which in turn enables an attached saw guide to be pivoted up (e.g., when not in use or when placing material on the work platform) or pivoted down (e.g., when in use). When the saw guide is used, the saw guide is substantially parallel to the top surface of the work platform and therefore the pivot plate 120 is substantially perpendicular to the first riser 110 (as best illustrated in FIG. 6). When the saw guide is in the fully raised position, the saw guide is substantially perpendicular to the top surface of the work platform and therefore the pivot plate 120 is substantially parallel to the first riser 110 (as illustrated in FIG. 12). When the saw guide is between the fully lowered position and the fully raised position, the pivot plate 120 is between substantially perpendicular and substantially parallel to the first riser 110 (as illustrated in FIG. 13).

While the illustrated embodiments show the hinges 122 connecting the pivot plate 120 to the first riser 110, any suitable pivoting mechanism may be used. In various embodiments, such a pivoting mechanism may have a suitable amount of inherent friction to help maintain the saw guide in a raised position (i.e., between fully down and fully up). Alternatively, in various embodiments a locking mechanism (not illustrated) may be used to maintain the saw guide in a raised position.

Since the rotatable plate 140 is selectively rotatably coupled to the pivot plate 120 and a saw guide is selectively attachable to the rotatable plate 140, the first saw guide support 100 enables a saw guide to be rotated or swiveled from side-to-side as well as being pivoted up and down. Swiveling the saw guide to an angle other than 90 degrees relative to the rear edge of the work platform enable a user to perform angled cuts (i.e., cuts at other than 90 degrees relative to the rear edge of the work platform). In the illustrated embodiment, the rotatable plate 140 comprises a planar main body 142, about half of which has an arcuate edge, with the arcuate edge having a narrowed shoulder 144.

Figure 10:
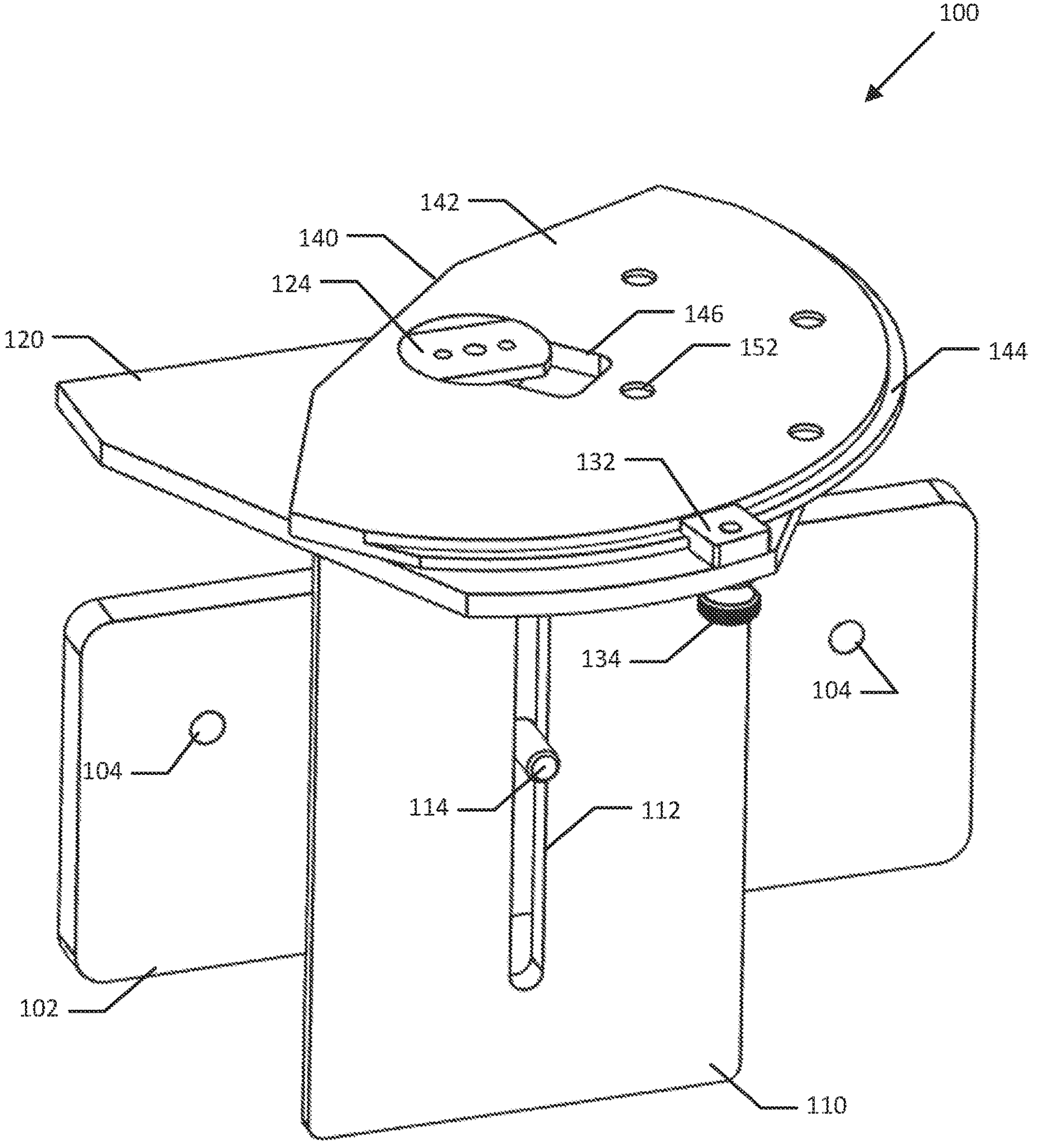
FIG. 10 is a perspective view of the first saw guide support of FIG. 1 from the rear, top, and right, with its rotatable plate rotated to a different position.

In various embodiments, the rotatable plate 140 is able to be selectively rotated to any one of a plurality of different positions relative to the pivot plate 120. For example, FIG. 10 illustrates the rotatable plate 140 of the first saw guide support 100 rotated to a different position than in FIGS. 1-4. In the illustrated embodiment, the position of the rotatable plate 140 relative to the pivot plate 120 is essentially infinitely adjustable. In various other embodiments, a fixed number of predetermined positions may be enabled (e.g., 30, 45 and 60 degrees). In various embodiments, any suitable mechanism may be used to selectively rotatably couple the rotatable plate 140 to the pivot plate 120.

Figure 5:
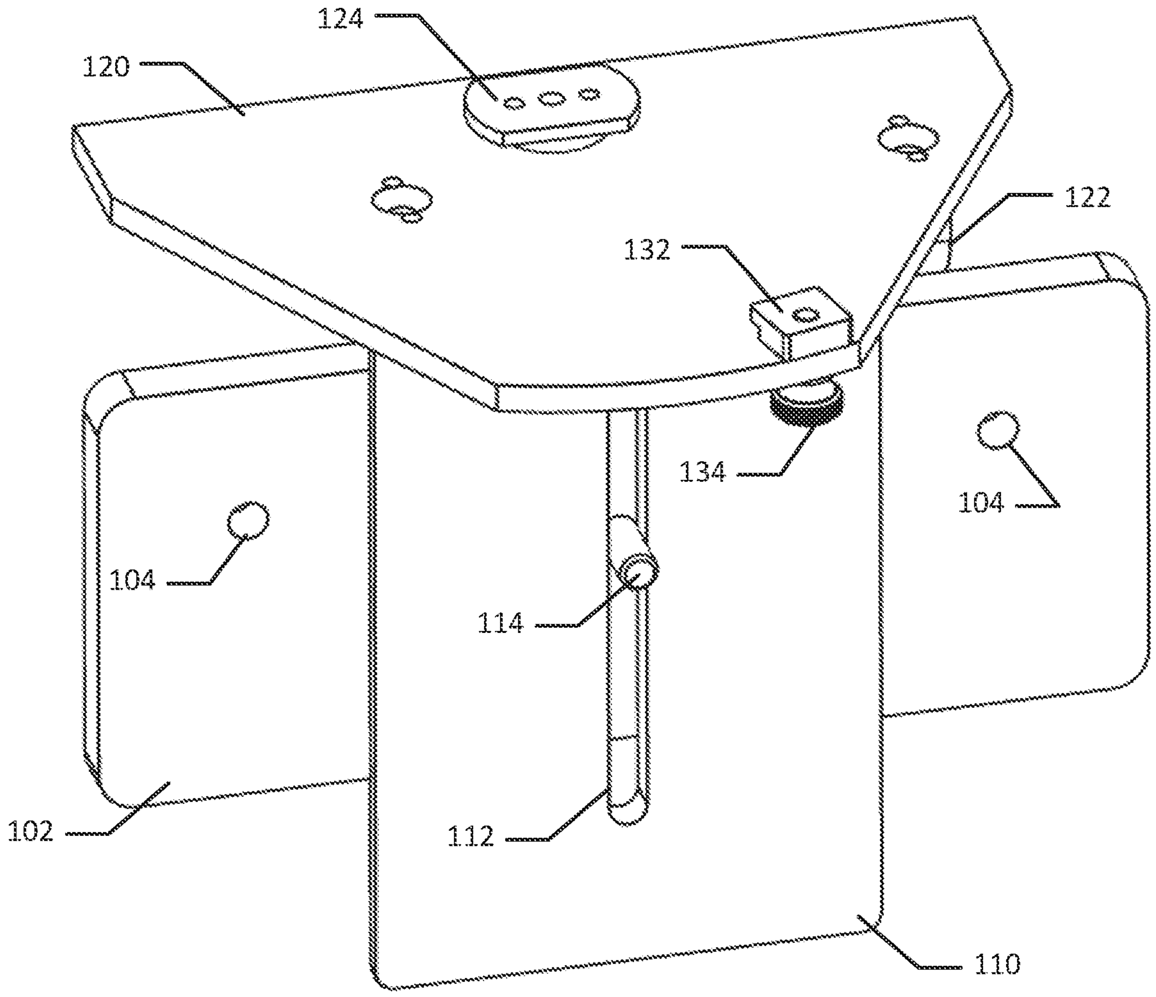
FIG. 5 is a perspective view of the first saw guide support of FIG. 1 from the rear, top, and right, with its rotatable plate removed.
Figure 7:
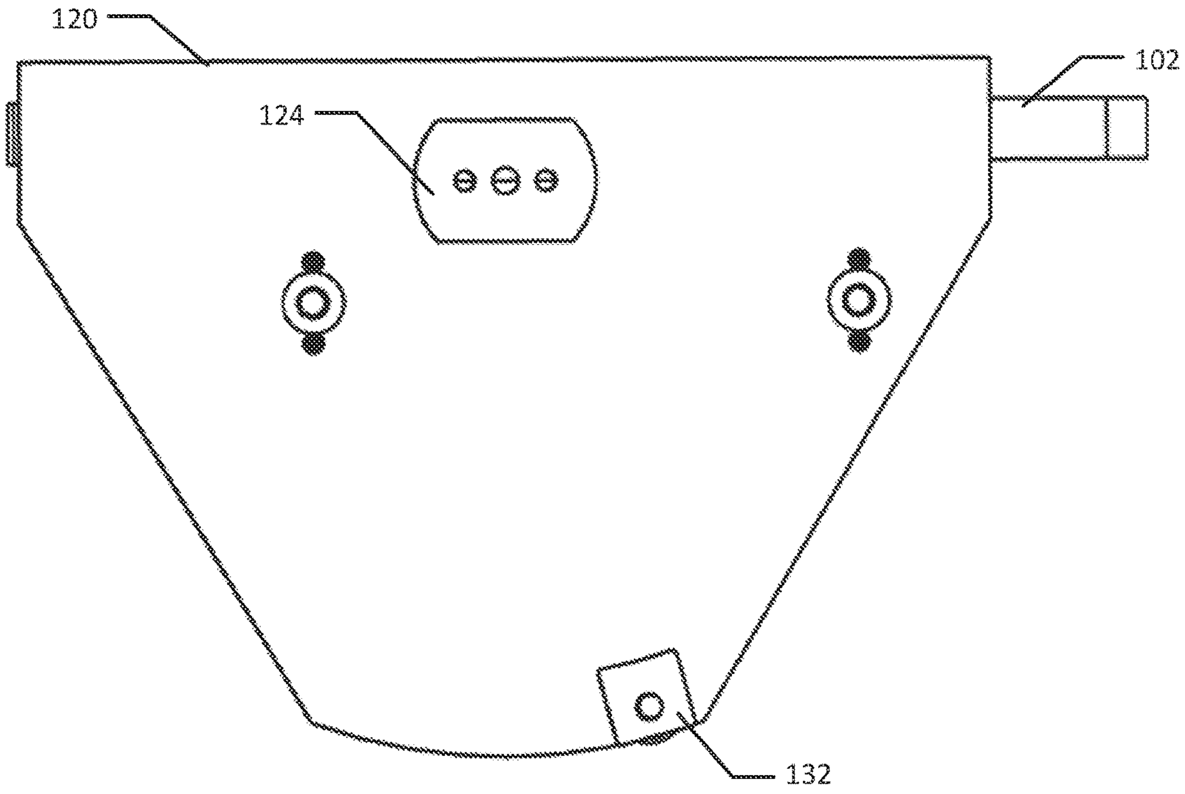
FIG. 7 is a top view of the first saw guide support of FIG. 1, with its rotatable plate removed.
Figure 8A:
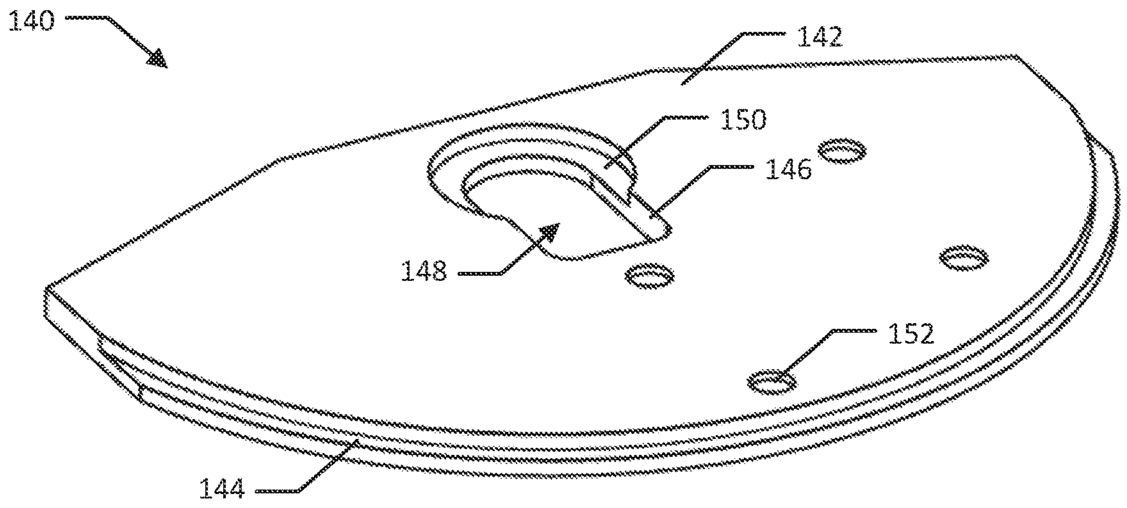
FIGS. 8A and 8B are, respectively, top and bottom perspective views of the rotatable plate of the first saw guide support of FIG. 1.
Figure 8B:
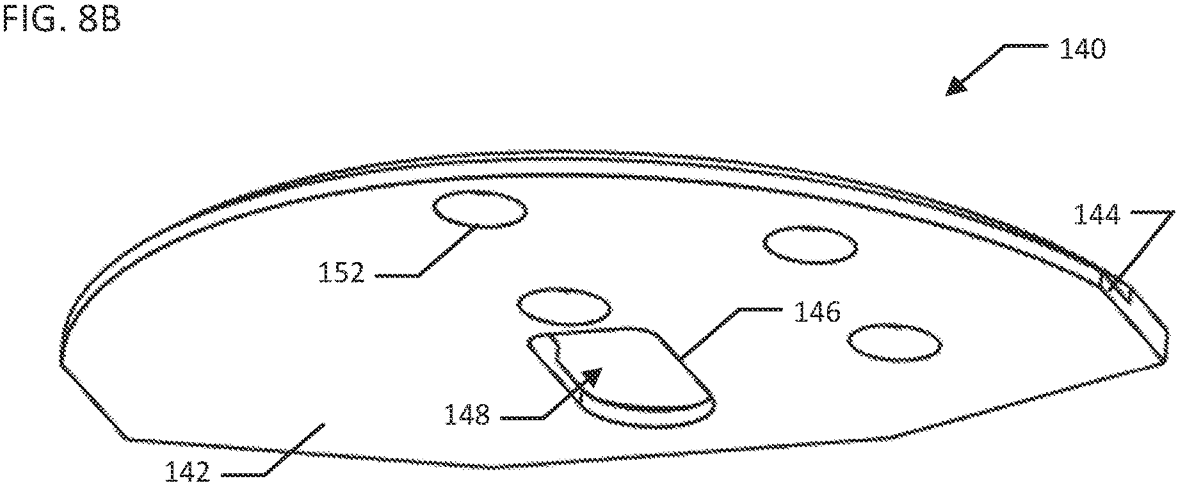
Figure 9A:
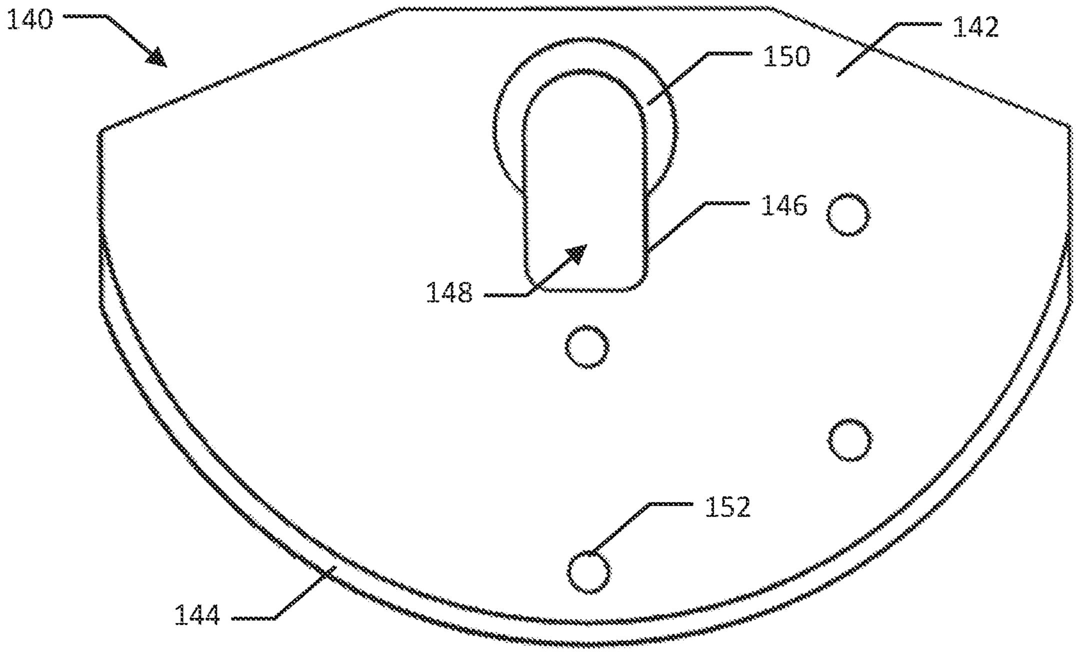
FIGS. 9A and 9B are, respectively, top and bottom views of the rotatable plate of the first saw guide support of FIG. 1.
Figure 9B:
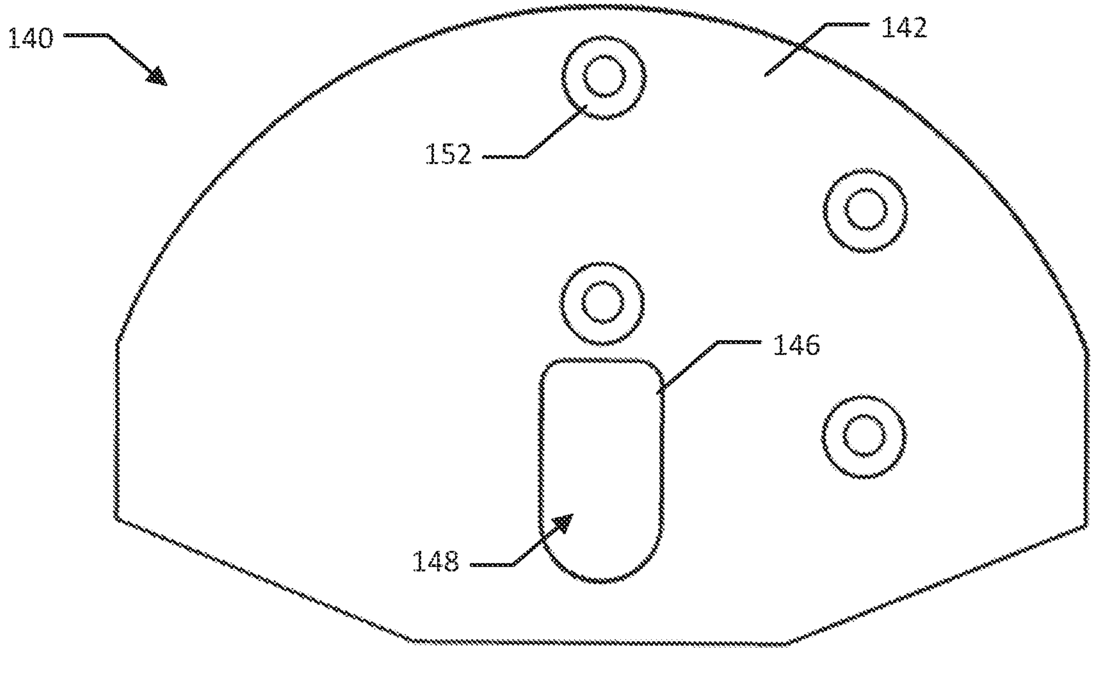

In the illustrated embodiment, the pivot plate 120 comprises an engagement member 124 comprising a post 126 projecting from the top planar surface of the pivot plate 120 and a bilaterally truncated disk 128 at a distal end of the post 126, as seen in FIGS. 5-7. Correspondingly, as seen in FIGS. 8A-9B, the rotatable plate 140 defines an engagement slot 146 having an elongated opening 148 with at least one arcuate end and a circular shoulder 150 around the arcuate end. The rotatable plate 140 is selectively coupled to the pivot plate 120 by aligning the elongated opening 148 of the engagement slot 146 with the bilaterally truncated disk 128 of the engagement member 124, inserting the bilaterally truncated disk 128 of the engagement member 124 into the elongated opening 148 of the engagement slot 146, sliding the engagement member 124 toward the circular shoulder 150 until the post 126 contacts the circular shoulder 150, and rotating the rotatable plate 140 such that the circular shoulder 150 of the engagement slot 146 is engaged between the bilaterally truncated disk 128 and the top planar surface of the pivot plate 120. In the illustrated embodiment, the arrangement of the engagement member 124 and the engagement slot 146 works to lock the rotatable plate 140 to the pivot plate 120 at all angles, except when the saw guide is parallel to the back edge of the work platform (in either direction) at which point the rotatable plate and saw guide can be removed from the pivot plate.

In the illustrated embodiment, a locking mechanism 132 engages with the shoulder 144 of the rotatable plate 140 to secure the rotatable plate 140 in a desired rotational position relative to the pivot plate 120. In the illustrated embodiment, the locking mechanism 132 is pulled against the shoulder 144 of the rotatable plate 140 by tightening threaded post 134 to secure the rotatable plate 140 in the desired rotational position. In various embodiments, any suitable mechanism may be used to secure the rotatable plate in a desired rotational position relative to the pivot plate.

Figure 11:
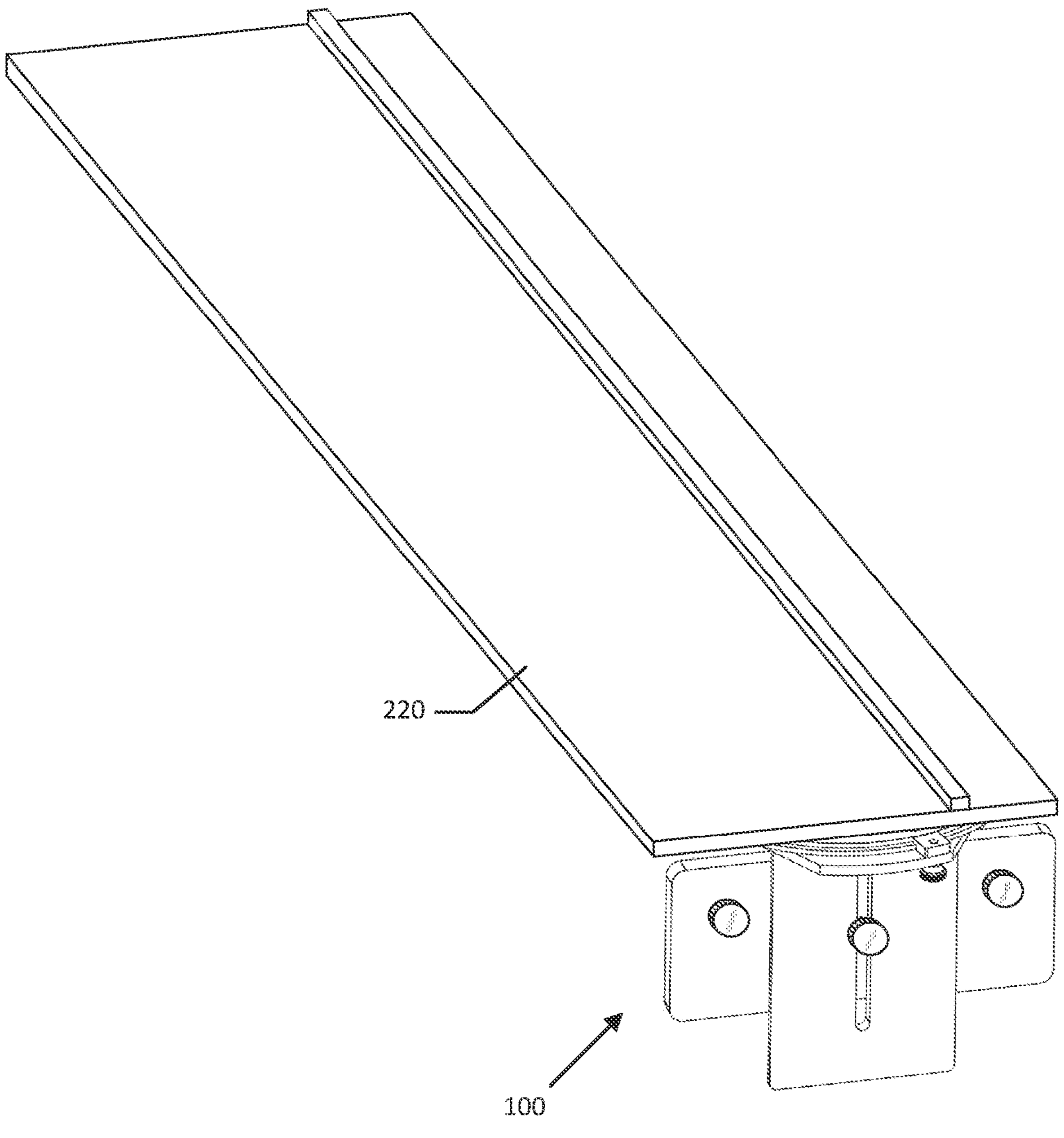
FIG. 11 is a perspective view of the first saw guide support of FIG. 1 from the rear, top, and right, with a saw guide attached.

It is conventionally known to secure a saw guide to a track saw hinge by securing a T-shaped engagement member to the track saw hinge and slidably engaging the T-shaped engagement member with a corresponding T-slot in the underside of the saw guide. In various embodiments of the present disclosure, the saw guide may be selectively secured to the rotatable plate 140 by attaching such a T-shaped engagement member (not illustrated) to the rotatable plate 140 via one or more of mounting holes 152 and then slidably engaging the T-shaped engagement member with a corresponding T-slot in the underside of the saw guide. In various embodiments, any suitable mechanism may be used to selectively secure a saw guide to the rotatable plate. FIG. 11 illustrates a saw guide 220 attached to a saw guide support 100.

When the saw guide is not in use, it is often desirable to remove the saw guide from the saw guide support of embodiments of the present disclosure for storage or portability. Because the rotatable plate 140 is readily detached from and attached to the pivot plate 120, without tools (by simply aligning the elongated opening 148 of the engagement slot 146 with the bilaterally truncated disk 128 of the engagement member, as described above), in various embodiments it may be desirable to remove the saw guide from the saw guide support by detaching the rotatable plate 140 from the pivot plate 120 (rather than detaching the saw guide from the rotatable plate 140).

Figure 14:
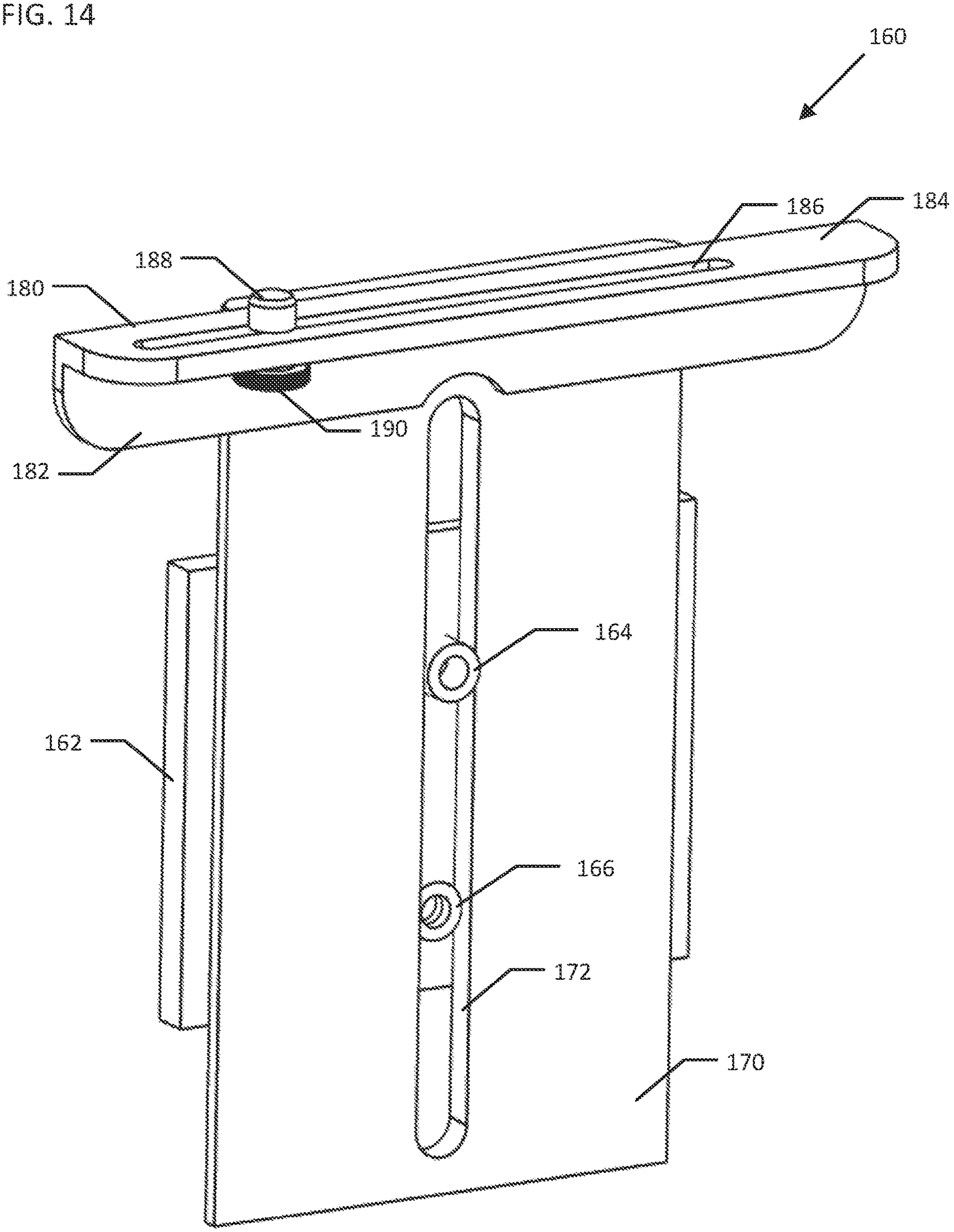
FIG. 14 is a perspective view of an example second saw guide support from the front, top, and left, in accordance with some embodiments of the present disclosure.
Figure 15:
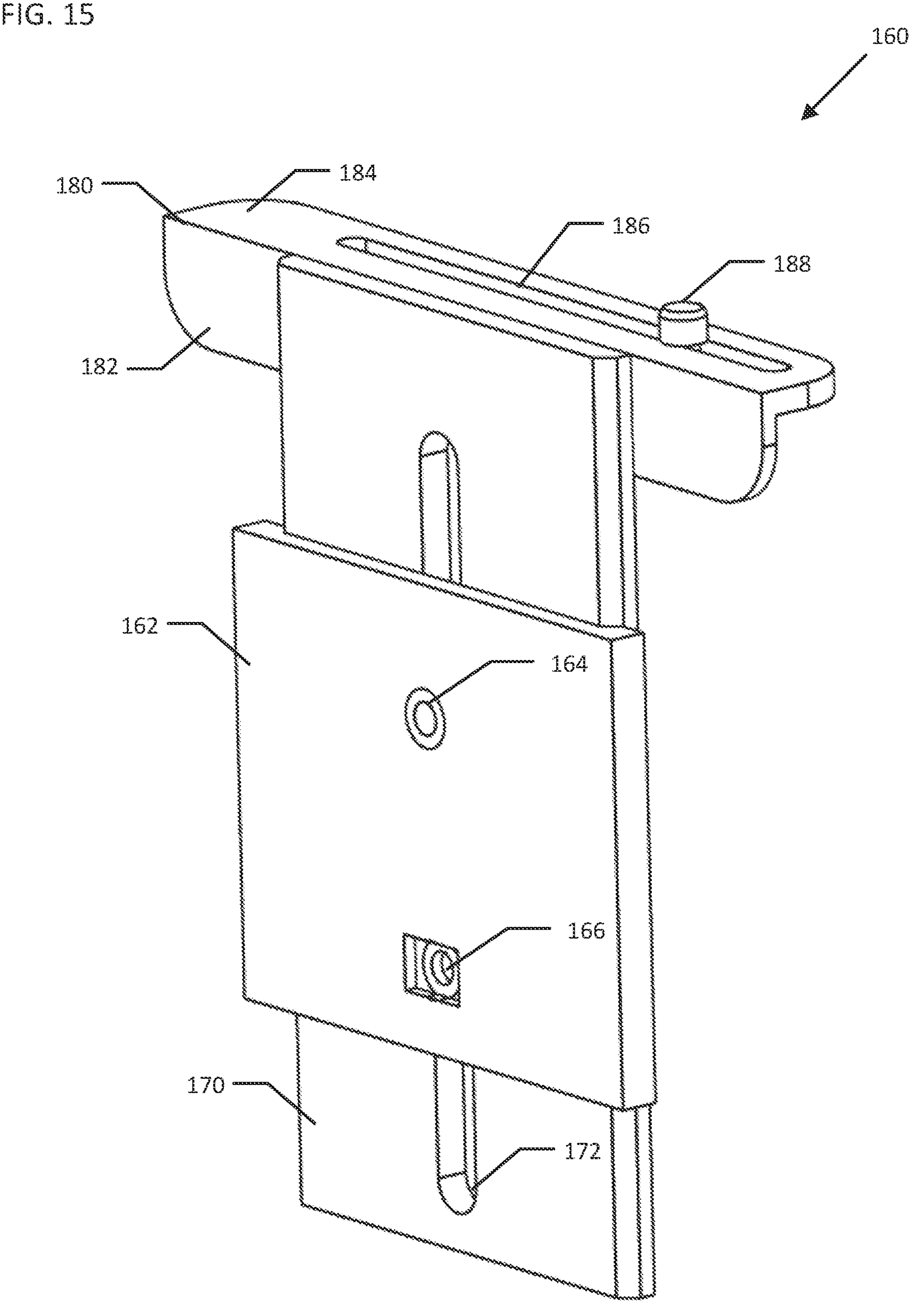
FIG. 15 is a perspective view of the second saw guide support of FIG. 14 from the rear, top, and left.
Figure 16:
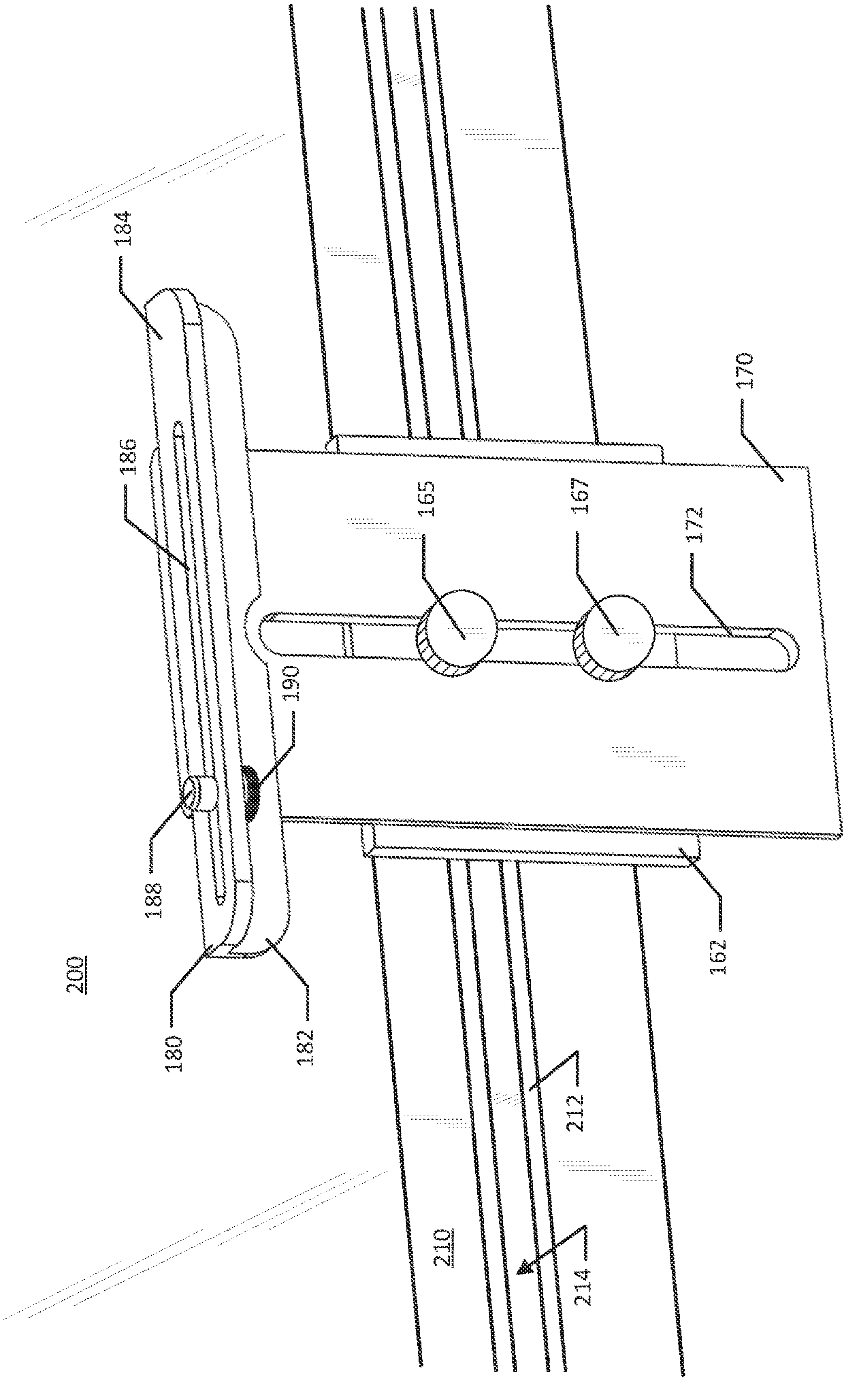
FIG. 16 is a perspective view of the second saw guide support of FIG. 14 from the front, top, and left, attached to a work platform.

Referring now to FIGS. 14-16, a second saw guide support 160 is illustrated, in accordance with various embodiments of the present disclosure. Such a second saw guide support 160 is attachable to a front edge of a work platform to support a distal end of a saw guide when the saw guide is in its down/cutting position. In the illustrated embodiment, the second saw guide support 160 comprises a second base plate 162, a second riser 170 vertically slidably coupled to the second base plate 162, a support bar 180 extending from an upper end of the second riser 170, and a support pin 188 extending upward from the support surface.

In various embodiments, the second saw guide support 160 is selectively attachable to a work platform, such as a work bench, via the second base plate 162. FIG. 16 illustrates the second saw guide support 160 attached to a front vertical surface 210 of the work platform 200. In the illustrated embodiment, the front vertical surface 210 of the work platform 200 has an insert 212 (typically metallic) that defines a generally horizontal channel 214 to enable the mounting of various accessories (e.g., clamps, etc.) to the work platform 200. In the illustrated embodiment, the second base plate 162 has a mounting hole 164 defined therein. In various embodiments, the second base plate 162 is secured to the insert 204 by way of a mounting post (not illustrated) that protrudes through the mounting hole 164 and into the channel 214 of the insert 212. In various embodiments, the mounting post is tightened against the insert 212 using knob 165 when the second base plate 162 (and therefore the second saw guide support 160) is in its desired position. In various embodiments, the second saw guide support 160 may be moved horizontally relative to the work platform 200 by loosening the knob 165, sliding the second saw guide support 160 into a new desired position, and re-tightening the knob 165. In various embodiments, any suitable mechanism may be used to secure the second saw guide support of embodiments of the present disclosure to a work platform.

In various embodiments, the second riser 170 is slidably coupled to the second base plate 162 to enable the second riser 170 (and correspondingly the support bar 180 to be raised and lowered relative to the work platform 200 to match the height of the first saw guide support 100.

In the illustrated embodiment, the second riser 170 is slidably coupled to the second base plate 162 via a post (not illustrated) projecting through hole 166 in the second base plate 162 engaging with a substantially vertical slot 172 defined in the second riser 170. In the illustrated embodiment, the second riser 170 is secured at the desired height by tightening a knob 167 against the face of the second riser 170. In various embodiments, any suitable mechanism may be used to slidably couple and secure the second riser to the base plate.

In the illustrated embodiment, the support bar 180 comprises a vertical portion 182 attached to an upper end of the second riser 170 (such as via welding or any other suitable method or mechanism) and a horizontal portion 184 attached to an upper end of the vertical portion 182 (such as via welding or any other suitable method or mechanism). In alternative embodiments, the support bar may be constructed as a single, unitary piece (e.g., the vertical portion and the horizontal portion may be formed by bending a flat piece of metal). In the illustrated embodiment, a channel 186 is defined in the horizontal portion 184.

The support pin 188 is adapted to support a distal end of the saw guide when the saw guide is pivoted down to a substantially horizontal position. In various embodiments, the support pin 188 engages with a corresponding structure on an underside of the saw guide when the saw guide is lowered onto the support pin. In the illustrated embodiment, the support pin 188 is attached to a tightening knob 190 via a post (not visible). In the illustrated embodiment, the post rides in the channel 186 to enable the support pin 188 to be moved to any desired position along the channel 186, thereby enabling the position of the support pin 188 to be fine-tuned to be able engagement with the corresponding structure on an underside of the saw guide. When the support pin 188 is in the correct position along the channel 186, the position of the support pin 188 is secured by tightening the knob 190.

The saw guide support of embodiments of the present disclosure enables cutting materials as many different angles, and the locking mechanism and front saw guide support provide repeatable accuracy even when the saw guide is repeatedly raised and lowered to remove and add material.

Conclusion

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved.

Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

What is claimed is:

1. A saw guide support comprising:

a base plate adapted to be selectively attached to a work platform;

a riser coupled to or integral with the base plate;

a pivot plate hingedly coupled to the riser such that an angle between the riser and the pivot plate is selectively adjustable; and a rotatable plate selectively rotatably coupled to the pivot plate and adapted to selectively receive a saw guide attached thereto;

wherein, when the saw guide is selectively attached to the rotatable plate, the saw guide support is adapted to enable the saw guide to be pivoted and rotated relative to the work platform;

wherein the pivot plate comprises an engagement member comprising a post projecting from a first planar surface of the pivot plate and a bilaterally truncated disk at a distal end of the post;

wherein the rotatable plate defines an engagement slot having an elongated opening with at least one arcuate end and a circular shoulder around the arcuate end; and wherein the rotatable plate is selectively coupled to the pivot plate by aligning the elongated opening of the engagement slot with the bilaterally truncated disk of the engagement member, inserting the bilaterally truncated disk of the engagement member into the elongated opening of the engagement slot, and rotating the rotatable plate such that the circular shoulder is engaged between the bilaterally truncated disk and the first planar surface of the pivot plate.

2. The saw guide support of claim 1, wherein the base plate is adapted to be selectively attached to a rear, vertical surface of the work platform.

3. The saw guide support of claim 1, wherein the base plate is adapted to be horizontally slidably positionable relative to the work platform.

4. The saw guide support of claim 1, further comprising a locking mechanism to secure a rotatable position of the rotatable plate relative to the pivot plate.

5. The saw guide support of claim 1, wherein the riser is vertically slidably coupled to the base plate.

6. A saw guide support system comprising:

(1) a first saw guide support comprising:

(i) a first base plate adapted to be selectively attached to a first end of a work platform;

(ii) a first riser coupled to or integral with the first base plate;

(iii) a pivot plate hingedly coupled to the first riser such that an angle between the first riser and the pivot plate is selectively adjustable; and (iv) a rotatable plate selectively rotatably coupled to the pivot plate and adapted to selectively receive a proximal end of a saw guide attached thereto; and (2) a second saw guide support comprising:

(i) a second base plate adapted to be selectively attached to a second end of the work platform opposite the first end;

(ii) a second riser coupled to or integral with the second base plate;

(iii) a support surface extending from an upper end of the second riser; and (iv) a support pin extending upward from the support surface;

wherein, when the saw guide is selectively attached to the rotatable plate, the first saw guide support is adapted to enable the saw guide to be pivoted and rotated relative to the work platform; and wherein the support pin is adapted to support a distal end of the saw guide when the saw guide is pivoted down to a substantially horizontal position.

7. The saw guide support system of claim 6, wherein the pivot plate comprises an engagement member comprising a post projecting from a first planar surface of the pivot plate and a bilaterally truncated disk at a distal end of the post;

wherein the rotatable plate defines an engagement slot having an elongated opening with at least one arcuate end and a circular shoulder around the arcuate end; and wherein the rotatable plate is selectively coupled to the pivot plate by aligning the elongated opening of the engagement slot with the bilaterally truncated disk of the engagement member, inserting the bilaterally truncated disk of the engagement member into the elongated opening of the engagement slot, and rotating the rotatable plate such that the circular shoulder is engaged between the bilaterally truncated disk and the first planar surface of the pivot plate.

8. The saw guide support system of claim 6, wherein the first base plate is adapted to be selectively attached to a rear, vertical surface of the work platform; and wherein the second base plate is adapted to be selectively attached to a front, vertical surface of the work platform.

9. The saw guide support system of claim 6, wherein the first base plate is adapted to be horizontally slidably positionable relative to the work platform; and wherein the second base plate is adapted to be horizontally slidably positionable relative to the work platform.

10. The saw guide support system of claim 6, further comprising a locking mechanism to secure a rotatable position of the rotatable plate relative to the pivot plate.

11. The saw guide support system of claim 6, wherein the first riser is vertically slidably coupled to the first base plate and the second riser is vertically slidably coupled to the second base plate.

12. The saw guide support system of claim 6, wherein the support pin is selectively slidable to adjust its position relative to the support surface.

13. The saw guide support system of claim 6, wherein the support surface is integral with the second riser.

14. A method of supporting a saw guide above a work platform, the method comprising:

(a) attaching a first saw guide support to a first end of the work platform, the first saw guide support comprising:

(i) a first base plate selectively attachable to the first end of the work platform;

(ii) a first riser coupled to or integral with the first base plate;

(iii) a pivot plate hingedly coupled to the first riser such that an angle between the first riser and the pivot plate is selectively adjustable; and (iv) a rotatable plate selectively rotatably coupled to the pivot plate;

(b) sliding the first base plate relative to the work platform to select a desired position of the first saw guide support;

(c) attaching a proximal end of the saw guide to the rotatable plate of the first saw guide support;

(d) attaching a second saw guide support to a second end of the work platform opposite the first end, the second saw guide support comprising:

(i) a second base plate selectively attachable to the second end of the work platform;

(ii) a second riser coupled to or integral with the second base plate;

(iii) a support surface extending from an upper end of the second riser; and (iv) a support pin extending upward from the support surface;

(e) sliding the second base plate relative to the work platform to select a desired position of the second saw guide support;

(f) pivoting the saw guide to a desired angle to match an angle between the first saw guide support and the second saw guide support; and (g) pivoting the saw guide downward until a distal end of the saw guide rests on the support pin.

15. The method of claim 14, wherein the pivot plate comprises an engagement member comprising a post projecting from a first planar surface of the pivot plate and a bilaterally truncated disk at a distal end of the post;

wherein the rotatable plate defines an engagement slot having an elongated opening with at least one arcuate end and a circular shoulder around the arcuate end;

wherein the method further comprises coupling the rotatable plate to the pivot plate; and wherein coupling the rotatable plate to the pivot plate comprises:

aligning the elongated opening of the engagement slot with the bilaterally truncated disk of the engagement member;

inserting the bilaterally truncated disk of the engagement member into the elongated opening of the engagement slot; and rotating the rotatable plate such that the circular shoulder is engaged between the bilaterally truncated disk and the first planar surface of the pivot plate.

16. The method of claim 14, wherein the first base plate is selectively attachable to a rear, vertical surface of the work platform; and wherein the second base plate is selectively attachable to a front, vertical surface of the work platform.

17. The method of claim 14, further comprising securing the rotatable plate relative to the pivot plate to maintain the desired angle of the saw guide matching the angle between the first saw guide support and the second saw guide support.

18. The method of claim 14, further comprising sliding the support pin relative to the support surface to position the support pin to engage with a corresponding structure on an underside of the saw guide.

19. The method of claim 14, wherein first riser is vertically slidably coupled to the first base plate and the second riser is vertically slidably coupled to the second base plate.

* * * * *